United States Patent [19]
Bongertman

[11] 3,970,542

[45] July 20, 1976

[54] METHOD OF PREPARING ELECTRODE PITCHES

[75] Inventor: Pieter Jan Willem Bongertman, Uithoorn, Netherlands

[73] Assignee: Cindu N.V., Yithoorn, Netherlands

[22] Filed: Nov. 15, 1974

[21] Appl. No.: 524,147

Related U.S. Application Data

[63] Continuation of Ser. No. 286,907, Sept. 7, 1972, abandoned.

[30] Foreign Application Priority Data

Sept. 10, 1971 Netherlands.................. 7112518

[52] U.S. Cl.................................. 208/22; 208/44
[51] Int. Cl.²................................ C10C 3/00
[58] Field of Search................ 208/22, 44, 23, 39, 208/42

[56] References Cited
UNITED STATES PATENTS

| | | | |
|---|---|---|---|
| 3,080,245 | 3/1963 | Barnett et al. | 208/39 |
| 3,173,851 | 3/1965 | King et al. | 208/42 |
| 3,374,104 | 3/1968 | Baum et al. | 208/42 |
| 3,692,663 | 9/1972 | Yeda et al. | 208/44 |
| 3,775,289 | 11/1973 | Kishi et al. | 208/39 |
| 3,794,579 | 2/1974 | Enomoto et al. | 208/22 |

*Primary Examiner*—Herbert Levine
*Attorney, Agent, or Firm*—Burgess Ryan and Wayne

[57] ABSTRACT

A method for the preparation of electrode pitch which includes mixing a highly aromatic residual fraction from petroleum raw materials with a coal tar pitch in a weight ratio of from 1:9 to 9:1 and heating the mixture at a temperature of above 350°C. until a pitch is produced with a softening point above 60°C., an insolubility in anthracene oil and toluene is over 30 percent and a coking value of at least 50 corresponding to binder pitch for the production of carbon, graphite electrodes and refractory material.

9 Claims, No Drawings

METHOD OF PREPARING ELECTRODE PITCHES

This is a continuation of application Ser. No. 286,907, filed Sept. 7, 1972, now abandoned.

This invention relates to a method of preparing an electrode pitch which is useful as a binder in the production of carbon electrodes for the aluminum industry, for the manufacture of different high temperature-proof materials and in the production of carbon products such as the manufacture of graphite and various parts for the electrochemical industry.

Electrode pitch for the above mentioned purposes should meet very special requirements since it is subjected to coking when being processed and is useful in producing a homogeneous carbon product having a high binding strength and possessing the desired electric and heat conductivity and which is substantially free of cracks. In addition, substantially negligible volatile substances are liberated resulting ordinarily in products of higher porosity and lower strength. In other words the coking residue should be as high as possible and such a product which is also free of the aforesaid undesirable objections is obtained by the present process.

For application in the aluminium industry, the pitch should not contain too many asbestos components which would ultimately be found in the aluminium melt and would adversely affect its purity. Finally the pitch should possess such a fluidity and constitution that at the processing temperatures it properly mixes and adheres to the solid aggregates to be bound.

Numerous specifications which the electrode pitches should meet have been developed by the electrode- and graphite industry and the producers of refractory materials. The most prominent specifications are:

Softening Point, ring-and-ball, appr. 105° C
Coke production (A.S.T.M. standard methods) as high as possible, at least 50 percent
Fraction insoluble in anthracene oil: 8 – 16 percent
Fraction insoluble in toluene: 30 – 38 percent
Density at 20° C (measure for aromaticity) as high as possible, preferably above 1.27
Ash content <0.3 percent
Sulfur content <0.8 percent Not every type of pitch meets these specifications and hence is suited for application as described above.

It is well-known (e.g. from U.S. Pat. Nos. 2,850,436 and 2,992,181) that pitches for various purposes such as for binders in pitch fibre tubes, briquettes, clay pigeons, etc. may be prepared from coal tar produced in the preparation of coke by dry distillation of coal and also from certain high boiling petroleum- or petroleum refinement fractions. For such pitch products, the requirements are quite different from requirements with respect to electrode pitches.

Until recently, only a highly aromatic pitch, consisting of a very complex mixture of compounds comprising highly condensated benzene rings, which compounds may be obtained from certain coal tars, are considered suitable for the preparation of electrode pitches wherein ultimate coking of the binder should occur.

Since on the one side the fast-growing aluminium industry has an ever increasing need of electrode pitch and on the other hand, aromatic residues of cracking processes are produced in the petroleum industry many attempts have already been made for preparing pitches also from other raw materials such as, e.g., from certain petroleum fractions or from petroleum refinement fractions, said pitches being capable of meeting the requirements for electrode pitches (vide e.g. Netherlands Patent Applications Nos. 267,528 and 6914814).

Most of these methods are economically not attractive because of their rather complicated processes since, e.g., a catalyst must be suspended in the product to be treated and must be separated out again or because after a catalytic or non-catalytic hydro-alkylation or a pyrogenic de-alkylation at a higher temperature, an oxidation at a lower temperature should follow, whereafter a further distillation takes place.

Moreover, in most cases, heterogeneous products are formed by coke formation in coarse separations of irregular dimensions, e.g., 1 – 20 mm, presumably caused by excess de-alkylation and polymerisation-condensationreactions.

According to these processes no homogeneous binders with densities of >1.26 with softening points of about 105°C ring-and-ball and a content of insoluble fraction in anthracene oil of between 8 and 16% are usually produced from petroleum residues.

This invention has for its object the provision of a method for preparing electrode pitches and other binders for carbon bodies.

The invention has more particularly for its object an improvement of the methods known in the art, starting from a petroleum fraction and resulting in an improvement of the quality of the pitch, especially of that pitch as is destined for serving as a binder for carbon electrodes or graphite products.

A further object of the invention is the provision of a simplified and thereby economically attractive method of preparing electrode pitch.

U.S. Pat. Nos. 2,826,507 and 3,355,377 disclose that the addition of carbon in preparing electrode pitch from petroleum fractions produces a favourable catalytic effect.

In the methods disclosed in these Patents, solid carbon is added to petroleum raffinate fractions whereupon, after heating and distillation, the pitch is separated out.

A disadvantage of these methods is the complicated treatment of the starting product.

The present invention is based on the discovery that the addition of carbon in the form of very finely suspended colloidal carbon particles, the latter being found in the fluid coal tar pitch, has a favourable catalytic effect.

The present invention is also concerned with a method of preparing electrode pitch wherein, before applying the heat treatment, the petroleum fraction, preferably in the fluid state, is admixed with a coal tar pitch, by which the undesired formation resulting from the thermal treatment of petroleum fractions can completely or nearly completely be inhibited.

The yield in electrode pitch and the latter's properties obtained by applying the method of the invention are more favourable than those which would have been obtained after mixing the individual thermally treated components.

The method of the invention consists of mixing a fluid cracking oil residue, e.g., obtained by steam cracking a gas oil naphtha at a high temperature i.e., in excess of 750°C and fractionating to separate said residual fractions followed by mixing the highly aromatic residual fraction thus obtained with a determinate amount of coal tar pitch whereafter said mixture is submitted to a heat treatment at temperatures of >350° C. In doing so, an amount of gas and light oil escapes depending on the choice of the raw material and the processing conditions.

The heat treatment is continued until a pitch is produced which as far as its softening point, its insolubility in anthracene oil and toluene and its coking value are concerned, corresponds to a binder pitch for the production of carbon, graphite electrodes and refractory material.

Those fractions may, e.g., be used as a highly-aromatic residual fraction from petroleum raw materials as have been produced by steam-cracking lighter petroleum fractions at temperatures above 750° C for preparing ethylene and propylene.

The softening point of said highly aromatic fraction may e.g. be >60° C.

The coal tar pitch used may e.g. have a content insoluble in anthracene oil of over 3 percent.

The product obtained by the present method is completely homogeneously fluid. No abnormal carbon deposit occurs in the preparation or at the walls of the reactor in which the preparation takes place. In the manufacture and application of electrodes in the aluminum melter, this pitch is found to have the same characteristics as those of electrode pitch from coal tar and meets the same requirements to be made to the latter.

Summarizing, in applying the method of the present invention a number of effects are obtained improving the quality of the resulting electrode pitch:
a. Increased formation of components which are insoluble in anthracene oil (C1-resins);
b. Increased formation of components which are insoluble in toluene however soluble in anthracene (C2-resins);
c. Very favourable course of the reactions during the heat treatment and as a result thereof 1.0 excess formation of carbon particles in the fluid or at the wall which phenomenon normally occurs especially at high temperatures;
d. In connection with c), the possibility of extending the reaction time at high temperatures as a result of which a differently oriented stabilisation (polymerisation and/or condensation) occurs;
e. A higher production output.

The invention is explained below in greater detail with reference to the following examples.

EXAMPLE 1 a. A cracking oil pitch having a softening point, ring-and-ball, of 84° C, a coke number of 27.6 and contents of 0% and 0.5%, respectively, insoluble in anthracene oil and toluene, were admixed at a rate of 4 : 1 with (b) a coal tar pitch having a softening point, ring-and-ball, of 87° C, a coke number of 50.1 percent and contents of 6.7 and 19.4 percent, respectively, insoluble in anthracene oil and toluene.

After heating at 390° C for 15 hours this mixture yielded 70 wt. percent of a homogeneous electrode pitch having a softening point, ring-and-ball, of 107° C, a coke number of 58.2 percent and contents of 9.0 and 34 percent, respectively, insoluble in anthracene oil and toluene and having a density of 1.275.

The calculated yield as would have been obtained by mixing raw materials individually submitted to a heat treatment, is 67 percent.

EXAMPLE II

The same method was used as in Example I; however now the cracking oil pitch and the coal tar pitch were mixed at the rate of 2 : 1.

After a heat treatment at 410° C for 6 hours, there was obtained 73 wt. percent of a homogeneous electrode pitch having a softening point, ring-and-ball, of 107° C, a coke number of 56.9 percent, contents of 6.4 and 32.6 percent, respectively, insoluble in anthracene oil and toluene and having a density of 1.280, resulted from said mixture. The calculated yield amounted to 70 percent.

EXAMPLE III

The same method was used as in Example I; however, now the cracking oil pitch and the coal tar pitch were mixed at the rate of 1 : 1.

After a heat treatment at 395° C for 17 hours there was obtained 84 wt percent of a homogeneous electrode pitch having a softening point, ring-and-ball, of 106° C, a coke number of 61.0, contents of 13.8% and 40.4%, respectively, insoluble in anthracene oil and toluene and having a density of 1.295 resulted from said mixture. The calculated yield was 76 percent.

EXAMPLE IV

The same method was used as in Example I, however now the cracking oil pitch and the coal tar pitch were mixed at the rate 1 : 2.

After a heat treatment at 400° C for 13 hours, 87 wt. percent of a homogeneous electrode pitch having a softening point, ring-and-ball, of 106° C, a coke number of 59.6, contents of 14 and 34.7 percent, respectively, insoluble in anthracene oil and toluene and having a density of 1.307 resulted from this mixture. The calculated yield was 82 percent.

EXAMPLE V

From 100 percent cracking oil pitch, after a heat treatment at 400° C for 5½ hours, 61 percent of a clotty mass resulted, having a softening point of 106° C, a coke number of 54.5, contents of 2.1 and 28.8%, respectively, insoluble in anthracene oil and toluene and having a density of 1.244.

EXAMPLE VI

From 100 percent coal tar pitch, after a heat treatment at 390° C for 15 hours 92 percent of a homogeneous electrode pitch resulted having a softening point of 106° C, a coke number of 59.9, contents of 14.7 and 35.5 percent, respectively, insoluble in anthracene oil and toluene and having a density of 1.320.

I claim:
1. A method of preparing electrode pitch consisting essentially of mixing
   a. a highly aromatic residual fraction produced by steam cracking a gas oil or naphtha at a temperature in excess of 750°C and fractionating to separate said residual fractions with
   b. a coal tar pitch in a weight ratio of 1:9 to 9:1 and heating said mixture at a temperature of above 350° to 400°C for about 5½ hours to about 17 hours.
2. The method of claim 1 in which the heat treatment is continued until a pitch is produced with a softening point, insolubility in anthracene oil and toluene and coking value corresponding to binder pitch for the production of carbon, graphite electrodes and refractory material.

3. The method of claim 1 wherein said highly aromatic residual fraction from petroleum raw material has a softening point above 60°C.

4. The method of claim 1 wherein said coal tar pitch has a content insoluble in anthracene oil of over 3 percent.

5. The method of claim 1 wherein the ratio of petroleum residue to coal tar pitch is from 4:6 to 6:4.

6. The process of claim 2, wherein said electrode pitch has a softening point of at least 105° (ring and ball); a coke number of at least 50, fraction insoluble in anthracene oil of 8–16 percent; fraction insoluble in anthracene oil of from 30–38 percent, and a density at 20°C of above 1.27.

7. The product obtained by the process of claim 1.

8. The product obtained by the process of claim 2.

9. The product obtained by the process of claim 6.

UNITED STATES PATENT OFFICE
CERTIFICATE OF CORRECTION

Patent No. 3,970,542  Dated July 20, 1976

Inventor(s) Pieter Jan Willem Bongertman

It is certified that error appears in the above-identified patent and that said Letters Patent are hereby corrected as shown below:

Column 2, line 64: Insert --or-- before "naphtha".

Column 3, line 38: "1.0" should be --no--.

Signed and Sealed this

Twenty-third Day of November 1976

[SEAL]

Attest:

RUTH C. MASON
Attesting Officer

C. MARSHALL DANN
Commissioner of Patents and Trademarks